(12) United States Patent
Pellman et al.

(10) Patent No.: US 9,056,254 B2
(45) Date of Patent: Jun. 16, 2015

(54) TIME-OF-FLIGHT CAMERA WITH GUIDED LIGHT

(71) Applicant: Microsoft Corporation, Redmond, WA (US)

(72) Inventors: Asaf Pellman, Even Yehuda (IL); David Cohan, Nesher (IL); Giora Yahav, Haifa (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/507,172

(22) Filed: Oct. 6, 2014

(65) Prior Publication Data

US 2015/0024847 A1 Jan. 22, 2015

Related U.S. Application Data

(62) Division of application No. 13/290,902, filed on Nov. 7, 2011, now Pat. No. 8,854,426.

(51) Int. Cl.
*H04N 15/00* (2006.01)
*H04N 13/00* (2006.01)
(Continued)

(52) U.S. Cl.
CPC ............... *A63F 13/213* (2014.09); *A63F 13/06* (2013.01); *A63F 13/10* (2013.01); *A63F 2300/1093* (2013.01); *A63F 2300/6045* (2013.01); *A63F 13/40* (2014.09)

(58) Field of Classification Search
CPC .................. H04N 13/0239; H04N 13/0055
USPC ...................................... 348/42–49
See application file for complete search history.

(56) References Cited

U.S. PATENT DOCUMENTS 4,627,620 A 12/1986 Yang
4,630,910 A 12/1986 Ross et al.
(Continued)

FOREIGN PATENT DOCUMENTS

CN 101254344 A 9/2008
EP 0583061 A2 2/1994
(Continued)

OTHER PUBLICATIONS

Fisher, S. et al., "Virtual Environment Display System," ACM 1986 Workshop on Interactive 3D Graphics, Oct. 23-24, 1986, 12 pages.
(Continued)

*Primary Examiner* — Chikaodili E Anyikire
(74) *Attorney, Agent, or Firm* — Gregg Wisdom; Judy Yee; Micky Minhas

(57) ABSTRACT

A gaming system comprising a time-of-flight 3D camera and related method for illuminating a camera field of view and capturing return image light are disclosed herein. In one example, the time-of-flight 3D camera includes a light source configured to emit source light along an optical axis, and a collimator configured to receive and collimate the source light to create collimated light. A refractive diffuser is operable to be tuned to the camera field of view and configured to receive and diffuse the collimated light to create refracted light having a varying intensity profile. The refractive diffuser is further configured to guide the refracted light to illuminate only a portion of the camera field of view to reduce wasted source light.

20 Claims, 4 Drawing Sheets

(51) Int. Cl.
  *H04N 13/02* (2006.01)
  *A63F 13/213* (2014.01)
  *A63F 13/20* (2014.01)
  *A63F 13/40* (2014.01)

(56) References Cited

U.S. PATENT DOCUMENTS

| | | |
|---|---|---|
| 4,641,964 A | 2/1987 | Mitani et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,098,184 A | 3/1992 | van den Brandt et al. |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,613,751 A | 3/1997 | Parker et al. |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,024,449 A | 2/2000 | Smith |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,105,869 A | 8/2000 | Scharf et al. |
| 6,128,003 A | 10/2000 | Smith et al. |
| 6,130,677 A | 10/2000 | Kunz |
| 6,133,986 A | 10/2000 | Johnson |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Mastuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,601,768 B2 | 8/2003 | McCall et al. |
| 6,606,173 B2 | 8/2003 | Kappel et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,431,480 B2 | 10/2008 | Godo |
| 7,436,496 B2 | 10/2008 | Kawahito |
| 7,450,736 B2 | 11/2008 | Yang et al. |
| 7,452,275 B2 | 11/2008 | Kuraishi |

(56) References Cited

U.S. PATENT DOCUMENTS

| | | | |
|---|---|---|---|
| 7,460,690 | B2 | 12/2008 | Cohen et al. |
| 7,489,812 | B2 | 2/2009 | Fox et al. |
| 7,536,032 | B2 | 5/2009 | Bell |
| 7,555,142 | B2 | 6/2009 | Hildreth et al. |
| 7,560,701 | B2 | 7/2009 | Oggier et al. |
| 7,570,805 | B2 | 8/2009 | Gu |
| 7,574,020 | B2 | 8/2009 | Shamaie |
| 7,576,727 | B2 | 8/2009 | Bell |
| 7,590,262 | B2 | 9/2009 | Fujimura et al. |
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,635,200 | B2 | 12/2009 | Atsushi |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| 7,884,985 | B2 | 2/2011 | Amitai et al. |
| 7,891,812 | B2 | 2/2011 | Larichev et al. |
| RE42,256 | E | 3/2011 | Edwards |
| 7,898,522 | B2 | 3/2011 | Hildreth et al. |
| 7,959,294 | B2 | 6/2011 | Balogh |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2003/0002296 | A1 | 1/2003 | Steiner et al. |
| 2004/0085544 | A1 | 5/2004 | De Groot |
| 2008/0026838 | A1 | 1/2008 | Dunstan et al. |
| 2008/0062424 | A1 | 3/2008 | Shires et al. |
| 2010/0114265 | A1 | 5/2010 | Lechthaler |
| 2011/0058167 | A1 | 3/2011 | Knox et al. |

FOREIGN PATENT DOCUMENTS

| | | |
|---|---|---|
| JP | 08044490 A | 2/1996 |
| WO | 9310708 A1 | 6/1993 |
| WO | 9717598 A1 | 5/1997 |
| WO | 9944698 A2 | 9/1999 |
| WO | 2011012913 A1 | 2/2011 |

OTHER PUBLICATIONS

Azarbayejani, A. et al., "Visually Controlled Graphics," IEEE Transactions on Pattern Analysis and Machine Intelligence, vol. 15, No. 6, pp. 602-605, Jun. 1993, 4 pages.

Sheridan, T. et al., "Virtual Reality Check," Technology Review, vol. 96, No. 7, pp. 20-28, Oct. 1993, 9 pages.

"Simulation and Training," Division Interactive, 1994, 6 pages.

Granieri, J. et al., "Simulating Humans in VR," Center for Human Modeling and Simulation, University of Pennsylvania, Oct. 12, 1994, 15 pages.

Freeman, W. et al., "Television Control by Hand Gestures," Mitsubishi Electric Research Laboratories Tech. Rep. TR94-24, Dec. 1994, 7 pages.

Breen, D. et al., "Interactive Occlusion and Collision of Real and Virtual Objects in Augmented Reality," European Computer-Industry Research Centre GmbH Tech. Rep. ECRC-95-02, 1995, 22 pages.

Stevens, J., "Flights Into Virtual Reality Treating Real World Disorders," Washington Post, Science Psychology Section, Mar. 27, 1995, 2 pages.

"Virtual High Anxiety," Popular Mechanics, vol. 172, No. 8, p. 22, Aug. 1995, 1 page.

Kanade, T. et al., "A Stereo Machine for Video-Rate Dense Depth Mapping and Its New Applications," 1996 IEEE Computer Society Conference on Computer Vision and Pattern Recognition, pp. 196-202, Jun. 1996, 7 pages.

Kohler, M., "Vision Based Remote Control in Intelligent Home Environments," University of Dortmund, Informatik VII (Computer Graphics), Nov. 1996, 8 pages.

Aggarwal, J. et al., "Human Motion Analysis: A Review," IEEE Nonrigid and Articulated Motion Workshop, pp. 90-102, Jun. 16, 1997, 13 pages.

Kohler, M., "Technical Details and Ergonomical Aspects of Gesture Recognition applied in Intelligent Home Environments," University of Dortmund, Informatik VII (Computer Graphics), Jul. 1997, 35 pages.

Pavlovic, V. et al., "Visual Interpretation of Hand Gestures for Human-Computer Interaction: A Review," IEEE Transactions on Pattern Analysis and Machine Intelligence, vol. 19, No. 7, pp. 677-695, Jul. 1997, 19 pages.

Wren, C. et al., "Pfinder: Real-Time Tracking of the Human Body," IEEE Transactions on Pattern Analysis and Machine Intelligence, vol. 19, No. 7, pp. 780-785, Jul. 1997, 6 pages.

Kohler, M., "Special Topics of Gesture Recognition Applied in Intelligent Home Environments," International Gesture Workshop on Gesture and Sign Language in Human-Computer Interaction, pp. 285-296, Sep. 17-19, 1997, 12 pages.

Miyagawa, R. et al., "CCD-Based Range-Finding Sensor," IEEE Transactions on Electron Devices, vol. 44, No. 10, pp. 1648-1652, Oct. 1997, 5 pages.

Isard, M. et al., "Condensation—Conditional Density Propagation for Visual Tracking," International Journal of Computer Vision, vol. 29, No. 1, pp. 5-28, Aug. 1998, 24 pages.

Shao, J. et al., "An Open System Architecture for a Multimedia and Multimodal User Interface," TIDE 1998 Conference, Japanese Society for Rehabilitation of Persons with Disabilities, Aug. 24, 1998, 8 pages.

Brogan, D. et al., "Dynamically Simulated Characters in Virtual Environments," IEEE Computer Graphics and Applications, vol. 18, No. 5, pp. 58-69, Sep./Oct. 1998, 12 pages.

Livingston, M., "Vision-Based Tracking With Dynamic Structured Light for Video See-Through Augmented Reality," Doctoral Dissertation, University North Carolina at Chapel Hill, Oct. 1998, 145 pages.

Hongo, H. et al., "Focus of Attention for Face and Hand Gesture Recognition Using Multiple Cameras," Fourth IEEE International Conference on Automatic Face and Gesture Recognition, pp. 156-161, Mar. 28-30, 2000, 6 pages.

Zhao, L. "Dressed Human Modeling, Detection, and Parts Localization," Doctoral Dissertation, The Robotics Institute Carnegie Mellon University, Tech. Rep. CMU-RI-TR-01-19, Jul. 26, 2001, 121 pages.

Qian, G. et al., "A Gesture-Driven Multimodal Interactive Dance System," 2004 IEEE International Conference on Multimedia and Expo, vol. 3, pp. 1579-1582, Jun. 30, 2004, 4 pages.

He, L., "Generation of Human Body Models," Masters Thesis in Computer Science, University of Auckland, Apr. 2005, 111 pages.

Rosenhahn, B. et al., "Automatic Human Model Generation," 11th International Conference on Computer Analysis of Images and Patterns, pp. 41-48, Sep. 5, 2005, 8 pages.

Hasegawa, S. et al., "Human-Scale Haptic Interaction with a Reactive Virtual Human in a Real-Time Physics Simulator," ACM Computers in Entertainment, vol. 4, No. 3, Article 6C, Jul. 2006, 12 pages.

Lecklider, T., "Shedding Some Light on Machine Vision," http://www.evaluationengineering.com/articles1200710/shedding-some-light-on-machine-vision.php, Accessed Aug. 5, 2011, Available as Early as Oct. 2007, 2 pages.

Chemisana, D. et al., "Characterization of Fresnal Lens Optical Performances Using and Opal Diffuser," Energy Conversion and Management, vol. 52, No. 1, pp. 658-663, Sep. 2010, 6 pages.

TIME-OF-FLIGHT CAMERA WITH GUIDED LIGHT

CROSS REFERENCE TO RELATED APPLICATIONS

This application is a divisional of U.S. patent application Ser. No. 13/290,902, filed on Nov. 7, 2011, and titled "TIME-OF-FLIGHT CAMERA WITH GUIDED LIGHT" the entire disclosure of which is hereby incorporated herein by reference.

BACKGROUND

An imaging device, such as a time-of-flight (TOF) three-dimensional (3D) camera, may include a light source for illuminating a scene containing one or more objects for imaging. The imaging device may collect light reflected from the objects on a photosensitive surface. An amount of light that the photosensitive surface receives per second per unit area (i.e., irradiance) depends in part upon the location of the objects in the scene, or in the example of a TOF 3D camera, the location of the objects in the camera's field of view. For an object having an angular displacement relative to an optical axis of the camera, the irradiance at the photosensitive surface will generally decrease as the angular displacement increases.

For TOF 3D cameras and other applications of imaging devices, it may be advantageous for objects in a scene to have a substantially equal irradiance on the photosensitive surface independent of the objects' angular displacement relative to the camera's optical axis. To compensate for a decrease in irradiance with angular displacement of an object in a scene, a camera illumination system may be configured to increase illumination of regions of the scene as a function of the region's increasing angular displacement from the optical axis. As a result, features having greater angular displacement are illuminated with more intense light.

An example illumination system that increases illumination of a region as a function of the angular displacement of the region may include a collimator that collimates light from a light source. A diffractive diffuser receives the collimated light and distributes the light across the camera field of view to compensate for the decrease in irradiance with angular displacement. However, diffractive diffusers are relatively inefficient and may deliver less than 75% of the light they receive from the light source to the camera field of view. Additionally, illumination systems are relatively expensive, and the costs and engineering difficulty associated with dissipating heat these systems generate increase with the amount of light they produce. Accordingly, the intensity of illumination produced by illumination systems is usually limited by cost considerations and heat dissipation requirements. Additionally, for applications that benefit from threshold irradiance values, such as a TOF 3D camera, the relative inefficiency of conventional camera illumination systems combined with the concomitant increase in costs and engineering difficulty associated with higher light output, may limit the operating precision capabilities of such applications.

SUMMARY

A gaming system comprising a time-of-flight 3D camera and related method for illuminating a camera field of view and capturing return image light are disclosed herein. In one example, the gaming system comprises a game console including a first controller and the time-of-flight 3D camera which includes a light source configured to emit source light along an optical axis, and a collimator configured to receive and collimate the source light to create collimated light. A refractive diffuser is operable to be tuned to the camera field of view and configured to receive and diffuse the collimated light to create refracted light having a varying intensity profile. The varying intensity profile is characterized by an intensity (I) that becomes lower toward the optical axis and higher away from the optical axis. The refractive diffuser is further configured to guide the refracted light to illuminate only a portion of the camera field of view to reduce wasted source light, wherein the intensity (I) of the refracted light increases as an angle θ between the refracted light and the optical axis increases. The camera also includes a light collector with a photosensitive surface configured to receive the return image light to be used for calculating a distance measurement of the object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
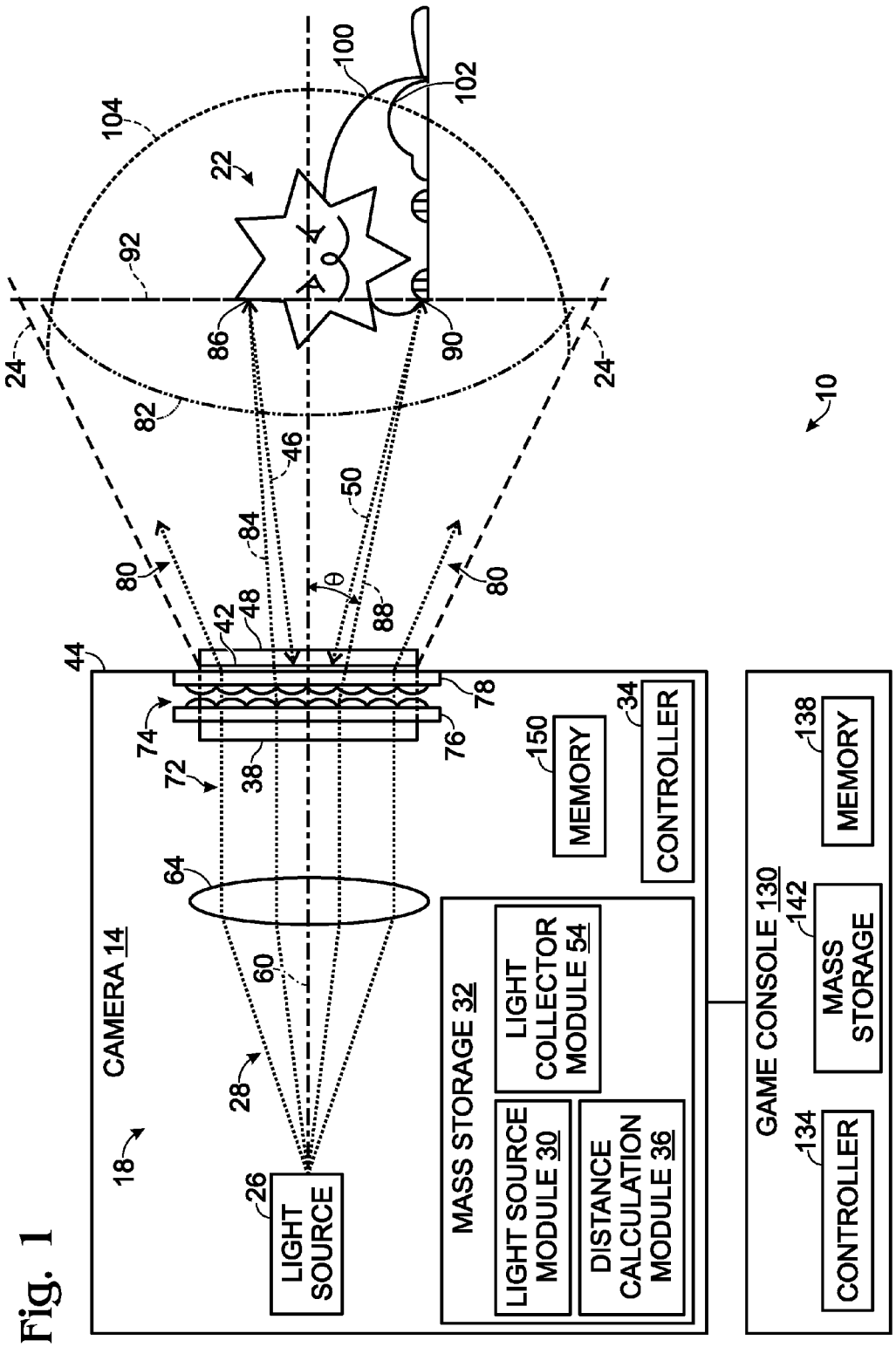
FIG. 1 is a schematic view of a gaming system including a TOF 3D camera and an associated game console according to an embodiment of the present disclosure.

FIG. 1 shows an embodiment of a gaming system 10 that includes a time-of-flight (TOF) three-dimensional (3D) camera 14. The TOF 3D camera 14 includes an illumination system 18 for illuminating an object 22 within a camera field of view 24 of the TOF 3D camera. The illumination system 18 includes a light source 26 for emitting source light 28. In some examples, the source light 28 may be pulsed light used to provide a basis for TOF measurements for determining 3D information related to the object 22, such as depth information. Light pulses of any suitable wavelength (e.g., one or more wavelengths in an infrared, near infrared, visible, and/or ultraviolet region) may be transmitted from the light source 26 to the object 22. In some examples, the light source 26 may be controlled by a light source module 30 in mass storage 32 of the TOF 3D camera 14. The light source module 30 may be configured to hold data and/or instructions executable by a controller 34 to control the light source 26.

To make TOF measurements using the emitted source light 28, in one example the TOF 3D camera 14 includes a light collector 38 with a photosensitive surface 42, such as a CMOS active pixel sensor. An objective lens 48 receives return image light reflected from the object 22, such as return image light rays 46 and 50, and focuses the return image light on the photosensitive surface 42. It will be appreciated that additional return image light rays (not shown) may be received by the photosensitive surface 42. It will be also be appreciated that in FIG. 1 the light collector 38 and objective lens 48 are schematically shown as located behind a refractive diffuser 74, described in more detail below. Additionally, for ease of illustration, the photosensitive surface 42 and objective lens 48 of the light collector 38 are shown as protruding from a right edge 44 of the TOF 3D camera 14. It will be appreciated that other configurations and positions of the light collector 38, photosensitive surface 42, and objective lens 48 with respect to the TOF 3D camera 14 and the refractive diffuser 74 may be possible and are included within the scope of this disclosure.

The time at which the return image light rays are received at the photosensitive surface 42 is measured to estimate the distance of various features of the object from the TOF 3D camera 14. Because light is typically returned relatively sooner from a near feature than from a far feature, time-dependent measurement and quantification of the return image light may provide distance information about the object's features.

In some examples, the light collector 38 may be controlled by a light collector module 54 in mass storage 32 of the TOF 3D camera 14. The light collector module 54 may be configured to hold data and/or instructions executable by the controller 34 to control the light collector 38. The TOF measurements may be performed by a distance calculation module 36 in mass storage 32 of the TOF 3D camera 14. The distance calculation module 36 may be configured to hold data and/or instructions executable by the controller 34 to make the TOF measurements.

Figure 2:
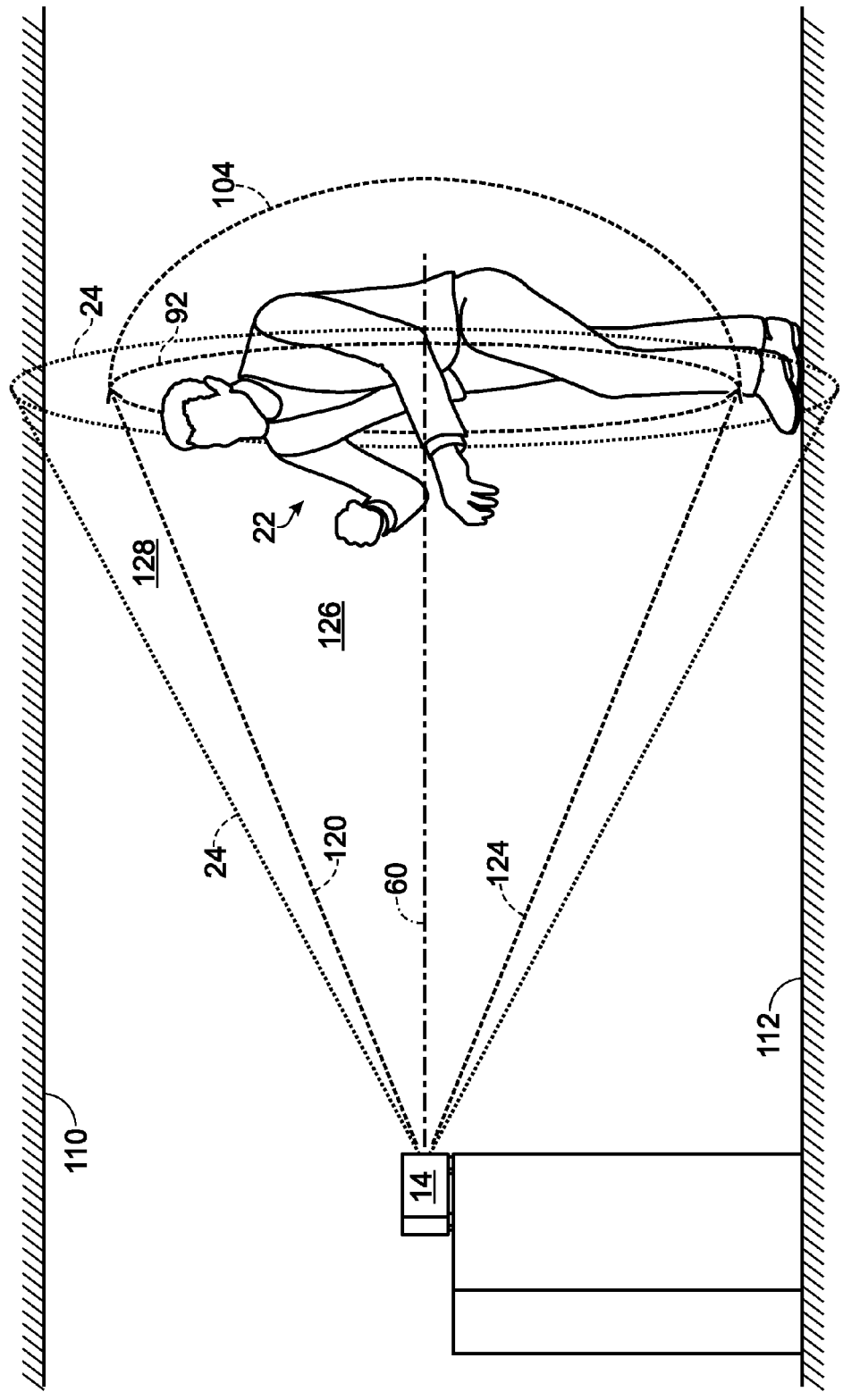
FIG. 2 is a schematic view of the TOF 3D camera of FIG. 1 located in a predetermined orientation relative to a floor according to an embodiment of the present disclosure.

In one example, and with reference also to FIG. 2, the object 22 being imaged may be a person interacting with the gaming system 10. In this example, TOF 3D camera 14 may be used to build a three-dimensional model of the person being imaged by the camera, which can be displayed or, in some scenarios, used as input for game software of the gaming system 10. The 3D model of the person may be used to present a graphical representation of the person in a video game display, for example, by including the model in a game cut scene. The TOF 3D camera 14 may also be used to receive user input from the modeled person, such that other interactive elements of the game software, such as non-player characters, artifacts, etc., respond to movements of the modeled person.

A more detailed description of one example of the gaming system 10 and the components and operation of the TOF 3D camera 14 will now be provided. With reference to FIG. 1, the light source 26 of the TOF 3D camera 14 emits the source light 28 along an optical axis 60. One or more rays of the source light 28 may propagate in a direction substantially parallel to the optical axis 60, and other rays may propagate in directions angularly displaced from the optical axis. A collimator 64 receives and collimates the source light 28 to create collimated light 72. The rays of collimated light 72 leaving the collimator 64 propagate in a direction substantially parallel to the optical axis 60 toward the refractive diffuser 74.

The refractive diffuser 74 receives and diffuses the collimated light 72 to create refracted light 80. In one example, the refractive diffuser 74 comprises a first array of lenslets 76 that are positioned substantially opposite to a second array of lenslets 78. The first array of lenslets 76 and second array of lenslets 78 are collectively configured to diffuse the collimated light 72 and create refracted light 80. As described in more detail below, the refracted light 80 created by the refractive diffuser 74 has a varying intensity profile 82, schematically illustrated as a curve in FIG. 1, that is characterized by an intensity (I) that becomes lower toward the optical axis 60 and higher away from the optical axis. In this manner, the refractive diffuser 74 may compensate for a decrease in irradiance with angular displacement of the refracted light 80 by increasing the illumination of regions within the camera field of view 24 corresponding to the increase in angular displacement of the regions.

The varying intensity profile 82 of the refracted light 80 is characterized by the intensity (I) of the refracted light increasing as an angle $\theta$ between the refracted light and the optical axis 60 increases. In one example, the intensity (I) may be related to the angle $\theta$ according to $I=1/\cos^4 \theta$. It will be appreciated that the intensity (I) may also be related to the angle $\theta$ according to any other power of cosine, such as $I=1/\cos \theta$, $I=1/\cos^2 \theta$, $I=1/\cos^{2.5} \theta$, or any other inverse function of a certain objective lens irradiance profile.

As illustrated in FIG. 1, a first ray 84 of the refracted light 80 impinges upon a first feature 86 of the object 22 and is reflected as first return image light ray 46 which impinges upon the photosensitive surface 42 of the light collector 38. A second ray 88 of the refracted light 80 impinges upon a second feature 90 of the object 22 and is reflected as second return image light ray 50 which impinges upon the photosensitive surface 42 of the light collector 38. The first return image light ray 46 and the second return image light ray 50 each produce an irradiance magnitude at the photosensitive surface 42 that is at least a threshold magnitude for calculating the distance measurement of the object 22. In one example, the threshold magnitude may be approximately 3 $\mu W/cm^2$, 5 $\mu W/cm^2$, 8 $\mu W/cm^2$ or other magnitude, or may be a range such as between approximately 1 $\mu W/cm^2$-10 $\mu W/cm^2$ or other suitable range.

First feature 86 and second feature 90 are both in a planar field of view imaging surface 92 which extends perpendicular to the optical axis 60. With reference to FIG. 2, another illustration of the planar field of view imaging surface 92 is provided. In this illustration, the planar field of view imaging surface 92 is shown in relation to the person, and may be described as a one dimensional cylindrical slice through a planar column of space intersecting the person. It will be appreciated that other rays of the refracted light 80 may impinge upon and be reflected by other features on the object 22 that lie in other planar field of view imaging surfaces that are located different distances from the TOF 3D camera 14. In other words, other planar field of view imaging surfaces containing other features on the object 22 may be located closer to and further away from the TOF 3D camera 14 than the illustrated planar field of view imaging surface 92.

With reference now to FIG. 1, in addition to both the first feature 86 and the second feature 90 being in the planar field of view imaging surface 92, in one example both features are also characterized by a shared reflectance value. The shared reflectance value may be, in one example, approximately 40% corresponding to a reflectance value associated with human skin, or in another example, approximately 15% corresponding to a material or composition of the first and second features 86, 90, or other reflectance value. It will be appreciated that other reflectance values may be associated with other features having different material properties.

In the present example where both the first feature 86 and the second feature 90 of the object 22 have a shared reflectance value, the varying intensity profile 82 of the refracted light 80 results in the first return image light ray 46 and the second return image light ray 50 each impinging upon the photosensitive surface 42 with an irradiance magnitude that is substantially equivalent. In this manner, it will be appreciated that two or more features of the object 22 that share a substantially equivalent reflectance value and are in a common planar field of view will each have a substantially equal irradiance magnitude at the photosensitive surface 42, via the return image light rays reflected by the features. Additionally, such substantially equal irradiance magnitude is independent of each feature's angular displacement relative to the optical axis 60. In TOF 3D cameras, creating such substantially equal irradiance magnitudes for multiple features sharing a common planar field of view enables the camera or associated imaging system to calculate distance measurements of objects with greater precision.

As further illustrated in FIG. 1, the object 22 may have a third feature 100 and a fourth feature 102 that are both in a spherical field of view imaging surface 104 which is bisected by the optical axis 60. It will be appreciated that the spherical field of view imaging surface 104 is schematically illustrated in FIG. 1 as a two-dimensional semi-circle surface. With reference to FIG. 2, another illustration of the spherical field of view imaging surface 104 is provided. In this illustration, the spherical field of view imaging surface 104 may be described as a hemispherical sweep through a curved portion of space. In a manner similar to rays of refracted light 80 impinging on first and second features 86, 90 in the planar field of view imaging surface 92, other rays of refracted light 80 (not shown) may impinge upon the third feature 100 and the fourth feature 102 and be reflected as rays of return image light that impinge upon the photosensitive surface 42 of the light collector 38.

It will also be appreciated that the refracted light 80 may impinge upon and be reflected by other features on the object 22 that lie in other spherical field of view imaging surfaces that are located different distances from the TOF 3D camera 14. Alternatively expressed, other spherical field of view imaging surfaces containing other features on the object 22 are located closer to and further away from the TOF 3D camera 14 than the illustrated spherical field of view imaging surface 104.

With reference now to FIG. 1, where the third feature 100 and fourth feature 102 are both characterized by a shared reflectance value, the varying intensity profile 82 of the refracted light 80 causes return image light rays reflected from the third and fourth features to impinge upon the photosensitive surface 42 with an irradiance magnitude that is substantially equivalent. In this manner, it will be appreciated that two or more features of the object 22 that share a substantially equivalent reflectance value and are in a common spherical field of view will each have a substantially equal irradiance magnitude on the photosensitive surface 42, via the return image light rays reflected by the features. Additionally, such substantially equal irradiance magnitude is independent of each feature's angular displacement relative to the optical axis 60.

In an example where the object 22 is a person, the gaming system 10 and/or TOF 3D camera 14 may be configured to build a three-dimensional model of the person being imaged by the camera based on one or more predetermined positions and orientations of the camera with respect to the person and the anticipated environments and surroundings in which the camera and person will be located. FIG. 2 illustrates an example predetermined position and orientation of the TOF 3D camera 14 in which the camera may be configured to produce a camera field of view 24 that includes a conical volume of field of view space 128 within which the person to be imaged may be expected to be located. Aspects of the person and the imaging environment may vary, such as the size and shape of the person, their movement and orientation with respect to the TOF 3D camera 14, the height of a ceiling 110 from a floor 112 in a room in which the gaming system 10 is being used, etc. Accordingly, the TOF 3D camera 14 may be configured to produce a camera field of view 24 that is large enough to include a volume of space within which the person is anticipated to be located while interacting with the gaming system 10 under a variety of circumstances and operational environments.

In the above example, and with reference also to FIG. 1, the refractive diffuser 74 of the TOF 3D camera 14 may be tuned to the camera field of view 24 to guide the refracted light 80 to illuminate the camera field of view in a manner that reduces wasted source light 28 produced by the light source 26. Portions of source light 28 that may be considered wasted source light include source light that propagates outside the camera field of view 24, and thus is likely unavailable for illuminating the object 22. By reducing source light 28 that is wasted, the intensity of source light that is produced from the light source 26 for efficient operation of the gaming system 10 may also be reduced. Further, by reducing the intensity of source light that is required, the heat dissipation needs of the light source 26, along with the associated component costs and engineering difficulty, may also be reduced.

In another example, the refractive diffuser 74 may be tuned to guide the refracted light 80 to illuminate only a portion of the camera field of view 24. With reference to FIG. 2, a first outermost ray 120 of the refracted light 80 and a second outermost ray 124 of the refracted light may define an outer contour of a conical volume of illuminated space 126 that is contained within, and thus smaller than, the conical volume of field of view space 128 defined by the camera field of view 24. In this example, the person is located in a predetermined orientation relative to the floor 112, and the portion of the camera field of view 24 that is illuminated by the conical volume of illuminated space 126 does not include the floor. In this example, by reducing the volume of space illuminated by the light source 26, the intensity of source light that is produced from the light source, along with the associated component costs and engineering difficulty, may be further reduced.

With reference to FIG. 1, it will be appreciated that the controller 34 in the TOF 3D camera 14 may process an input signal from the light collector 38 that is generated by rays of return image light, such as rays 46 and 50, impinging upon the photosensitive surface 42. The controller 34 may generate an output signal based on the input signal that indicates a depth of the object 22 in the camera field of view 24 based on a time difference between emitting the source light 28 and receiving at the photosensitive surface 42 the return image light reflected by the object 22. The output signal may then be outputted by the controller 34 to a game console 130. In one example, the game console 130 includes a controller 134, memory 138 and mass storage 142. It will be appreciated that in other examples the TOF 3D camera 14 may output raw image data from the light collector 38 for processing by the controller 134 and memory 138 of the game console 130 to calculate a depth of the object 22 in the camera field of view 24.

Figure 3:
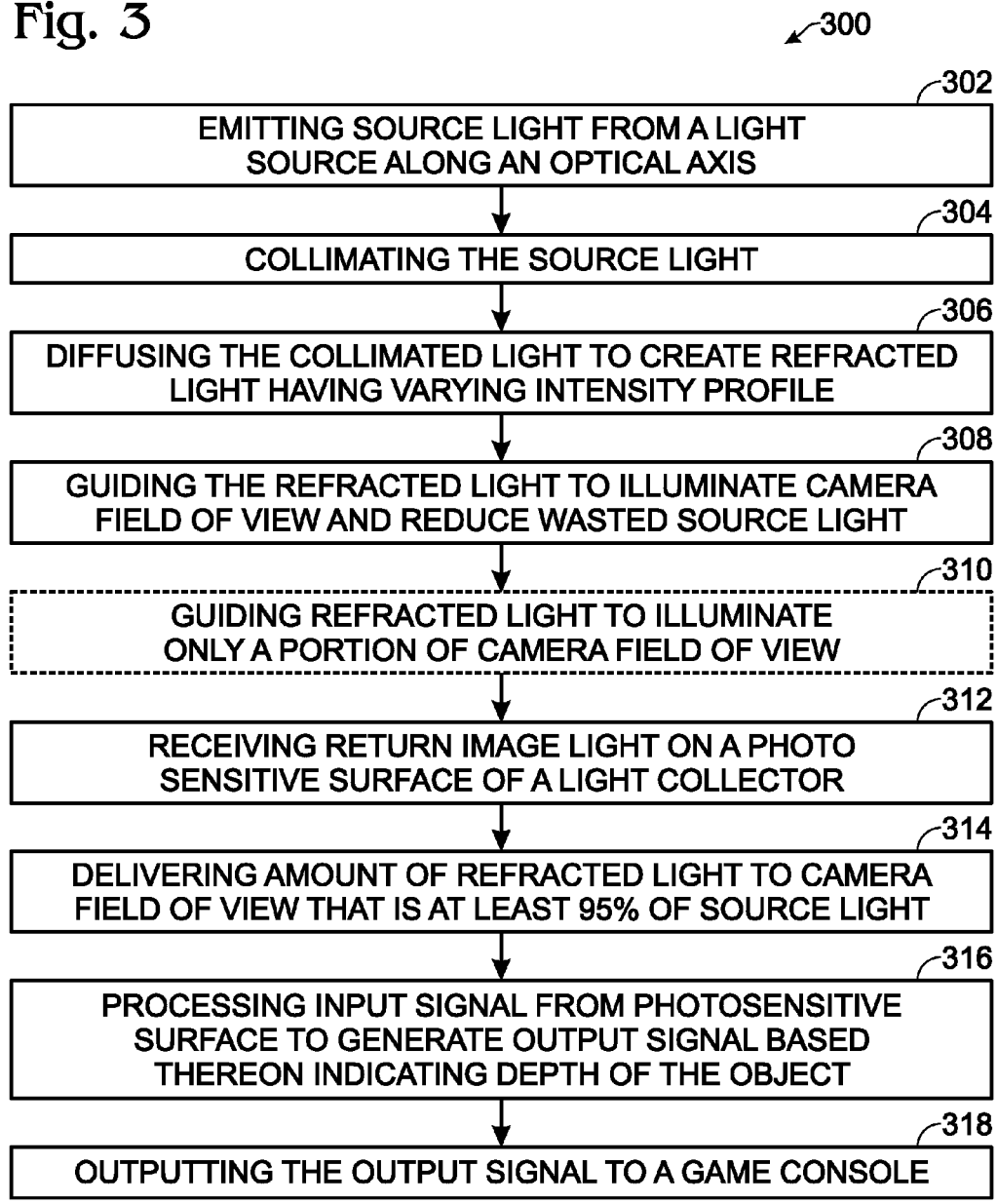
FIG. 3 shows a flow chart for a method of illuminating a camera field of view in a TOF 3D camera, and capturing return image light reflected by an object in the camera field of view according to an embodiment of the present disclosure.

Turning now to FIG. 3, and with reference also to the examples illustrated in FIGS. 1 and 2, a flow chart is provided for one embodiment of a method 300 of illuminating a camera field of view in a TOF 3D camera and capturing return image light reflected by an object. The method may comprise a control algorithm in the form of instructions stored in memory 150 of the TOF 3D camera 14 and executed by controller 34, and/or instructions stored in memory 138 of the game console 130 and executed by controller 134. The instructions may be performed by the hardware and components illustrated in FIGS. 1 and 2 and described above. It will be appreciated that the method may also be performed by any other suitable hardware, software and/or components.

Method 300 comprises, at 302, emitting source light 28 from the light source 26 along optical axis 60. At 304, the method includes collimating the source light 28 to create collimated light 72. At 306, the method includes diffusing the collimated light 72 to create refracted light 80 having a varying intensity profile 82 that is characterized by an intensity (I) that becomes lower toward the optical axis 60 and higher away from the optical axis. As noted above, the varying intensity profile 82 of the refracted light 80 is characterized by the intensity (I) of the refracted light increasing as an angle θ between the refracted light and the optical axis 60 increases. In one example, the intensity (I) may be related to the angle θ according to $I = 1/\cos^4 \theta$. As noted above, the refractive diffuser 74 may be used to diffuse the collimated light 72. The refractive diffuser 74 may comprise a first array of lenslets 76 that are positioned substantially opposite to a second array of lenslets 78, with the first and second arrays of lenslets collectively configured to guide the refracted light in a manner that produces the varying intensity profile 82.

At 308, the method includes guiding the refracted light 80 to illuminate the camera field of view 24 and reduce wasted source light 28. At 310, the method optionally includes guiding the refracted light to illuminate only a portion of the camera field of view. As noted above, where the object 22 is located in a predetermined orientation relative to a floor 112, the portion of the camera field of view 24 illuminated by the refracted light 80 may not include the floor.

At 312, the method includes receiving the return image light on the photosensitive surface 42 of the light collector 38 for calculating a distance measurement of the object 22. As noted above, the return image light at the photosensitive surface 42 may have an irradiance of at least a threshold magnitude for calculating the distance measurement of the object 22. Additionally, where at least two features of the object are both in a planar field of view imaging surface, such as first feature 86 and second feature 90 in planar field of view imaging surface 92, or both features are in a spherical field of view imaging surface, such as third feature 100 and fourth feature 102 in spherical field of view imaging surface 104, and both features of the object are characterized by a shared reflectance value, a magnitude of the irradiance at the photosensitive surface 42 is substantially equivalent for both features of the object 22.

At 314, the method also includes delivering an amount of the refracted light 80 to the camera field of view 24 that is at least 95% of an amount of the source light 28 emitted by the light source 26.

At 316, the method includes processing an input signal from the photosensitive surface 42 to generate an output signal based thereon that indicates a depth of the object 22 in the camera field of view 24 based on a time difference between emitting the source light 28 and receiving at the photosensitive surface the return image light reflected by the object 22. At 318, the method includes outputting the output signal to the game console 130.

Figure 4:
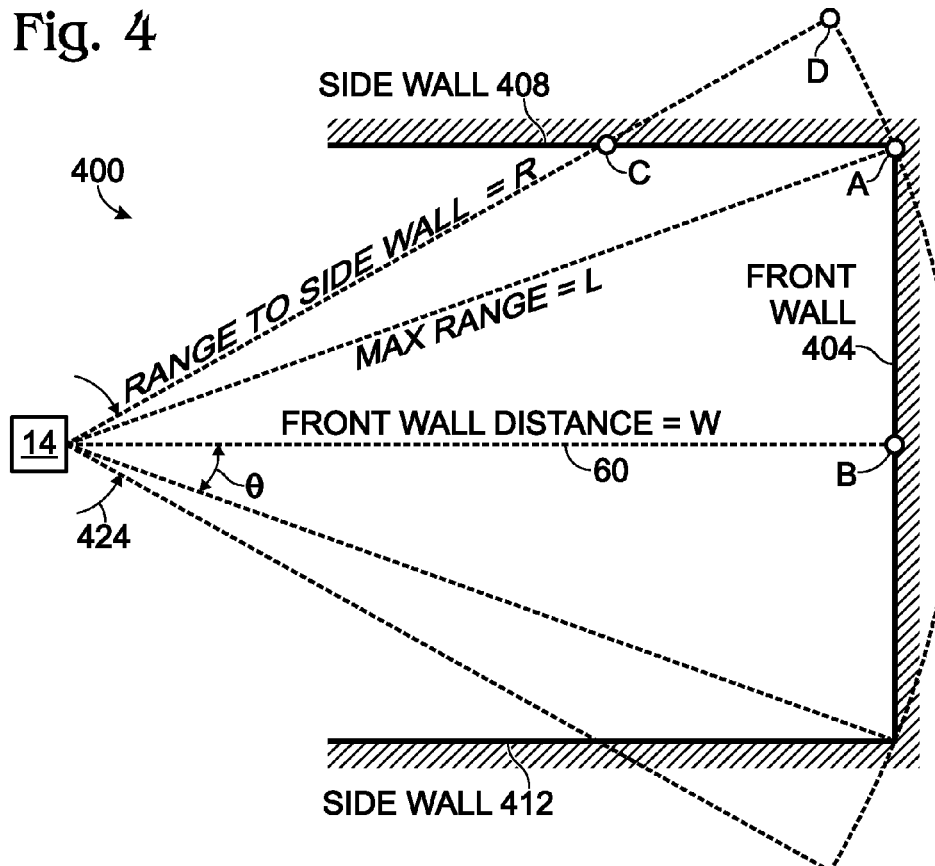
FIG. 4 shows a schematic top view of a room and a horizontal working space in which a TOF 3D camera according to an embodiment of the present disclosure is located.

In another example, the refractive diffuser 74 may be tuned to illuminate the full camera field of view while also reducing the intensity (I) of the refracted light as a function of an instant range (R) compared to a maximum range (L). FIG. 4 illustrates a top view of a room 400 and a horizontal working space with a camera 14 located at a distance (W) from a front wall 404. To illuminate all of the room space within the camera field of view 424, the camera 14 supports a maximum range of (L) to a point (A) in a corner of the room 400 that is the furthest point in the room from the camera. The maximum range (L) defines a threshold intensity ($I_1$) of the refracted light at point (A) that is needed for depth detection. In order to have intensity ($I_1$) at point (A), an emitted intensity of ($I_0$) at the exit of the refractive diffuser 74 of camera 14 is projected to point (A).

If the illumination system 18 of camera 14 is designed to produce the threshold intensity ($I_1$) equally on a hemisphere or a planar surface, then any other point along the front wall 404 or side walls 408, 412 except point (A) would be closer to the camera 14 than point (A). Consequently, at such other point there would be a higher intensity than the minimum intensity needed for depth detection at such point. In other words, source light that is emitted from the refractive diffuser 74 towards a certain point, such as point (C) on side wall 408, would contain enough energy to cover maximum range (L) to hypothetical point (D), while the space to be illuminated is actually bounded by the side wall 408 to a closer instant range (R). At instant range (R) a minimum intensity needed for depth detection is an intensity (h) but the range relative to the maximum (L) in this case is shorter by a factor of (R/L). Accordingly, the emitted intensity ($I_0$) towards point (C) can be reduced by a factor of $(R/L)^2$.

Figure 5:
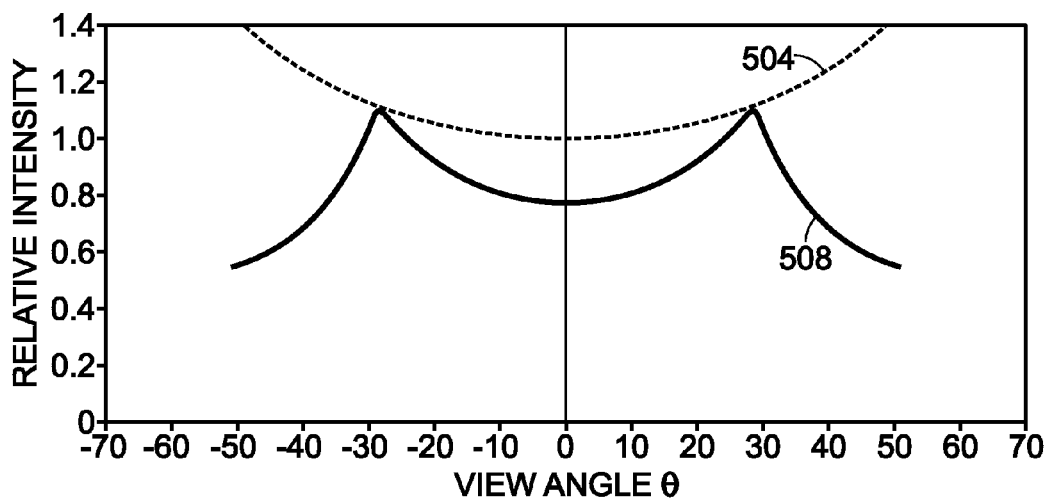
FIG. 5 shows a graphical illustration of two examples of intensity profiles for source light emitted by the TOF 3D camera of FIG. 4.

It will be appreciated that varying the intensity profile produced by the refractive diffuser as a function of an instant range (R) and a maximum range (L) may be combined with varying the intensity profile according to the angle θ between the refracted light and the optical axis 60 as described above. FIG. 5 shows an example of an intensity profile 504 according to the angle θ and an intensity profile 508 according to an instant range (R) compared to a maximum range (L) and corresponding to the shape of the room 400 in FIG. 4. It will be appreciated that integrating for the two profiles 504 and 508 yields energy savings of about 28% as compared to producing the threshold intensity ($I_1$) equally on a hemisphere or a planar surface, which energy savings increase as the camera field of view 424 increases. It will also be appreciated that intensity profiles may be designed in a similar manner for a vertically oriented working space.

Using the TOF 3D cameras, systems and methods described above, a camera field of view may be illuminated with efficiencies greater than those generally provided by conventional illumination systems. Such improved illumination efficiencies can reduce material costs and heat dissipation constraints associated with conventional illumination systems, while also providing enhanced homogeneity of irradiance from features in the camera field of view.

It will be appreciated that, while some of the example embodiments described herein make reference to game consoles and gaming systems, these example embodiments are provided only for descriptive purposes, and the TOF 3D cameras and methods for illuminating a camera field of view described herein may be used in any suitable context and/or operating environment within the scope of the present disclosure. Other non-limiting example operating environments include mobile wireless devices, client computing devices, and server computing devices.

Aspects of this disclosure are described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included herein are schematic and generally not drawn to scale. Rather, the various drawing scales, aspect ratios, and numbers of components shown in the figures may be purposely distorted to make certain features or relationships easier to see.

The term "module" may be used to describe an aspect of the TOF 3D camera 14 that is implemented to perform one or more particular functions. In some cases, such a module may be instantiated via controller 34 executing instructions held in mass storage 32 and loaded into memory 150 in the TOF 3D camera 14, or via controller 134 executing instructions held in mass storage 142 and loaded into memory 138 in the game console 130. It is to be understood that different modules may be instantiated from the same application, service, code block, object, library, routine, API, function, etc. Likewise, the same module may be instantiated by different applications, services, code blocks, objects, routines, APIs, functions, etc. The term module" is meant to encompass individual or groups of executable files, data files, libraries, drivers, scripts, database records, etc.

It is to be understood that the examples, configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A gaming system comprising:
a game console including a first controller; and
a time-of-flight 3D camera for illuminating a camera field of view and capturing return image light reflected by an object in the camera field of view, the time-of-flight 3D camera operatively connected to the game console for calculating a distance measurement of the object, the time-of-flight 3D camera comprising:
a light source configured to emit source light along an optical axis;
a collimator configured to receive and collimate the source light to create collimated light;
a refractive diffuser that is operable to be tuned to the camera field of view and configured to receive and diffuse the collimated light to create refracted light, wherein the refracted light has a varying intensity profile that is characterized by an intensity (I) that becomes lower toward the optical axis and higher away from the optical axis, the refractive diffuser configured to guide the refracted light to illuminate only a portion of the camera field of view to reduce wasted source light, wherein the intensity (I) of the refracted light increases as an angle θ between the refracted light and the optical axis increases; and
a light collector having a photosensitive surface configured to receive the return image light to be used for calculating the distance measurement of the object.

2. The gaming system of claim 1, wherein the return image light at the photosensitive surface has an irradiance of at least a threshold magnitude for calculating the distance measurement of the object.

3. The gaming system of claim 2, wherein at least two features of the object are both in a planar field of view imaging surface or both in a spherical field of view imaging surface, the at least two features of the object are both characterized by a shared reflectance value, and a magnitude of the irradiance at the photosensitive surface is substantially equivalent for the return image light reflected by the at least two features of the object.

4. The gaming system of claim 1, wherein the intensity (I) is related to the angle θ according to $I=1/\cos^4 \theta$.

5. The gaming system of claim 1, wherein the varying intensity profile is further characterized by the intensity (I) having a maximum value to sufficiently illuminate the object at a maximum range (L), and the intensity (I) decreasing as an instant range (R) decreases below the maximum range (L).

6. The gaming system of claim 5, wherein the refractive diffuser comprises a first array of lenslets that is substantially opposite to a second array of lenslets, the first array of lenslets and the second array of lenslets collectively configured to guide the refracted light in a manner that produces the varying intensity profile.

7. The gaming system of claim 1, further comprising a second controller that processes an input signal from the photosensitive surface and generates an output signal based thereon that indicates a depth of the object in the camera field of view.

8. The gaming system of claim 7, wherein the depth of the object is based on a time difference between emitting the source light and receiving at the photosensitive surface the return image light reflected by the object, the output signal being outputted to the game console by the second controller of the camera.

9. The gaming system of claim 1, wherein the intensity (I) is related to the angle θ according to an inverse function of an objective lens irradiance profile.

10. The gaming system of claim 1, wherein an amount of the refracted light delivered to the camera field of view by the refractive diffuser is at least 95% of an amount of the source light emitted by the light source.

11. In a time-of-flight 3D camera operatively connected to a game console, a method for illuminating a camera field of view and capturing return image light reflected by an object in the camera field of view, comprising:
emitting source light from a light source along an optical axis of the camera;
collimating the source light to create collimated light;
diffusing the collimated light to create refracted light having a varying intensity profile that is characterized by an intensity (I) that becomes lower toward the optical axis and higher away from the optical axis, the intensity (I) of the refracted light increasing as an angle θ between the refracted light and the optical axis increases;
guiding the refracted light to illuminate only a portion of the camera field of view and reduce wasted source light; and
receiving the return image light on a photosensitive surface of a light collector for calculating a distance measurement of the object.

12. The method of claim 11, wherein the return image light at the photosensitive surface has an irradiance of at least a threshold magnitude for calculating the distance measurement of the object.

13. The method of claim 12, wherein at least two features of the object are both in a planar field of view imaging surface or both in a spherical field of view imaging surface, the at least two features of the object are both characterized by a shared reflectance value, and a magnitude of the irradiance at the photosensitive surface is substantially equivalent for the return image light reflected by the at least two features of the object.

14. The method of claim 11, wherein the object is located in a predetermined orientation relative to a floor, and the portion of the camera field of view does not include the floor.

15. The method of claim 11, wherein diffusing the collimated light comprises diffusing the collimated light using a refractive diffuser, and the refractive diffuser comprises a first array of lenslets that is substantially opposite to a second array of lenslets, the first array of lenslets and the second array of lenslets collectively configured to guide the refracted light in a manner that produces the varying intensity profile.

16. The method of claim 11, further comprising processing an input signal from the photosensitive surface to generate an output signal based on the input signal, the output signal indicating the depth of the object.

17. The method of claim 16, further comprising outputting the output signal to the game console.

18. The method of claim 11, wherein the intensity (I) is related to the angle θ according to $I=1/\cos^4 \theta$.

19. The method of claim 11, further comprising delivering an amount of the refracted light to the camera field of view that is at least 95% of an amount of the source light emitted by the light source.

20. A gaming system comprising:
a game console including a first controller; and
a time-of-flight 3D camera for illuminating a camera field of view and capturing return image light reflected by an object in the camera field of view, the time-of-flight 3D camera operatively connected to the game console for calculating a distance measurement of the object, the time-of-flight 3D camera comprising:
a light source configured to emit source light along an optical axis;
a collimator configured to receive and collimate the source light to create collimated light;
a refractive diffuser that is operable to be tuned to the camera field of view and configured to receive and diffuse the collimated light to create refracted light, wherein the refracted light has a varying intensity profile that is characterized by an intensity (I) of the refracted light having a relationship to an angle θ between the refracted light and the optical axis that is characterized by $I=1/\cos^4 \theta$, the refractive diffuser configured to guide the refracted light to illuminate the camera field of view to reduce wasted source light;
a light collector having a photosensitive surface configured to receive the return image light and generate an input signal to be used for calculating the distance measurement of the object, wherein at least two features of the object are both in a planar field of view imaging surface or both in a spherical field of view imaging surface, the at least two features of the object are both characterized by a shared reflectance value, and a magnitude of an irradiance at the photosensitive surface is substantially equivalent for the return image light reflected by the at least two features of the object; and
a second controller configured to process the input signal and generate an output signal based thereon that indicates a depth of the object in the camera field of view.

* * * * *